(12) United States Patent
Naughton

(10) Patent No.: US 6,240,425 B1
(45) Date of Patent: May 29, 2001

(54) GEOGRAPHIC SEARCH ENGINE HAVING INDEPENDENT SELECTIONS OF DIRECTION AND DISTANCE FROM A RELOCATABLE HUB

(76) Inventor: John Naughton, 174 Linden Dr., Cohasset, MA (US) 02025

( * ) Notice: Subject to any disclaimer, the term of this patent is extended or adjusted under 35 U.S.C. 154(b) by 0 days.

(21) Appl. No.: 09/141,129

(22) Filed: Aug. 27, 1998

Related U.S. Application Data

(60) Provisional application No. 60/070,253, filed on Dec. 31, 1997.

(51) Int. Cl.[7] ............................................. G06F 17/30
(52) U.S. Cl. ................. 707/104; 707/3; 701/208
(58) Field of Search ................... 707/104, 1–4, 707/101–102; 340/990, 995; 701/201, 208

(56) References Cited

U.S. PATENT DOCUMENTS

| | | | |
|---|---|---|---|
| 5,032,989 | | 7/1991 | Tornetta . |
| 5,543,788 | * | 8/1996 | Mikuni ................................. 701/201 |
| 5,551,024 | * | 8/1996 | Waters ..................................... 707/1 |
| 5,559,707 | * | 9/1996 | DeLorme et al. ................... 364/443 |
| 5,584,025 | * | 12/1996 | Keithley et al. ..................... 707/104 |
| 5,754,850 | * | 5/1998 | Janssen ................................. 707/104 |
| 5,781,773 | * | 7/1998 | Vanderpool et al. ................ 707/101 |
| 5,794,216 | * | 8/1998 | Brown ..................................... 705/27 |
| 5,852,810 | * | 12/1998 | Sotiroff et al. ......................... 705/27 |
| 5,944,769 | * | 8/1999 | Musk et al. .......................... 701/201 |
| 5,956,716 | * | 9/1999 | Kenner et al. ......................... 707/10 |

OTHER PUBLICATIONS

"The Dynamic HomeFinder: Evaluating Dynamic Queries in a Real–Estate Information Exploration System," Williamson et al., Proceedings of the Fifteenth Annual International ACM SIGIR Conference on Research and Development in information retrieval, Jun. 21, 1992.*

* cited by examiner

*Primary Examiner*—Hosain T. Alam
(74) *Attorney, Agent, or Firm*—Morse, Altman & Martin

(57) ABSTRACT

Method and apparatus for searching a geographic database for properties within a specified range of distances and range of directions from a selected hub location. The invention includes a global computer network, the database, and a search program. The network includes a database computer, a user interface computer, and a search computer. Each database record includes a physical location of the property. The search program takes as inputs a selected hub, a range of distances, and a range of directions. The search program iterates through the records to find those properties the fall within the parameters and displays them to the user.

18 Claims, 2 Drawing Sheets

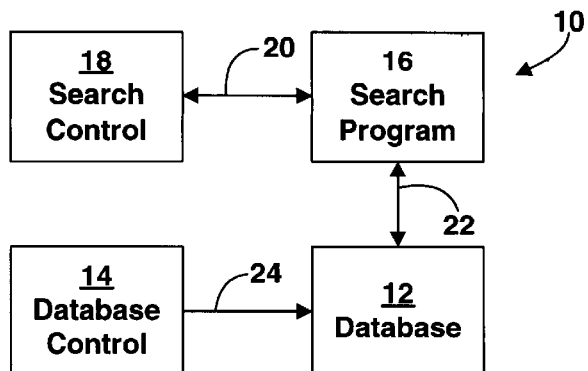
FIG. 1
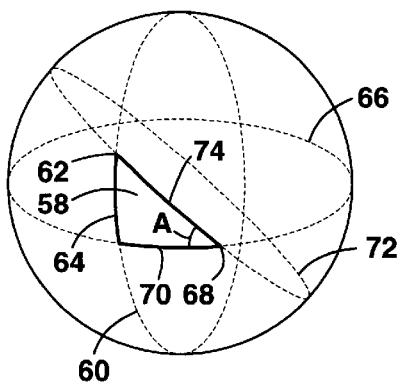
FIG. 4
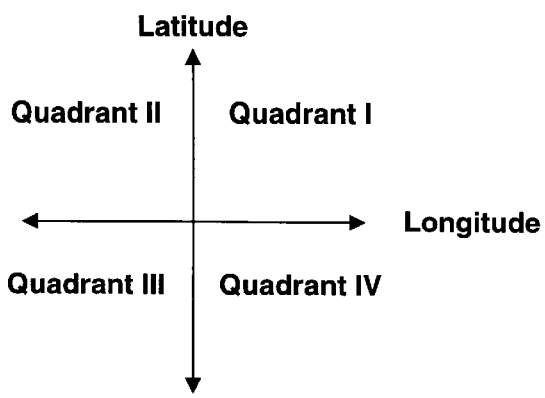
FIG. 3
FIG. 5

GEOGRAPHIC SEARCH ENGINE HAVING INDEPENDENT SELECTIONS OF DIRECTION AND DISTANCE FROM A RELOCATABLE HUB

RELATED APPLICATIONS

The applicant wishes to claim the benefit of U.S. Provisional Patent Application No. 60/070,253, dated Dec. 31, 1997 for GEOGRAPHIC SEARCH ENGINE in the name of John Naughton.

BACKGROUND OF THE INVENTION

1. Field of the Invention

The present invention relates to database search engines, more particularly, to a search engine and associated database for searching for locations by distance and direction from a specified location.

2. The Prior Art

There are many situations where a person wants to find a geographic location relative to another. For example, a person may need to find a child care center within 2 miles of her home, or new office space within 5 miles of the downtown district of a city. Databases and programs for searching databases to find real properties are known and programs to find geographic locations are known. For example, U.S. Pat. No. 5,032,989, issued to Tornetta, discloses a database of properties for sale, rent, and lease and a means for viewing the information in the database in graphical form based on distance from a central location. It does not allow the user to select specific minimum and maximum ranges for distances from the central location, nor does it allow the user to narrow the search based upon direction.

SUMMARY OF THE INVENTION

An object of the present invention is to provide a person searching for geographically-organized locations a means to search by specifying a range of distances and a range of directions from a specified central location.

The present invention includes three basic components: (1) a computer network, (2) a database, and (3) a search program. The computer network is a collection of computers that communicate to exchange information. All types of networks are contemplated, including local area networks (LAN), wide area networks (WAN), and internets, including the Internet. Various elements of the other components of the present invention reside on nodes of the network, including a database node, a control node, a search node, and a user interface node. Any of these nodes may be contained on any number of computers. For example, the database and control will typically reside on the same computer.

The second component, the database, includes a record for each property that can be included in the search. The actual information in the record and consequently, the structure of the record and database, depends upon the type of search to be performed. Regardless of the type of search, every record includes the physical location of the property. The physical location is relative to a known location on the Earth so that the search program can determine its distance and direction from a specified hub, and is preferably denoted as the latitude from the equator and the longitude from the prime meridian at Greenwich, England.

There are provisions for database maintenance, which include adding, removing, and modifying records. The present invention contemplates that different entities may have different security levels of access to the database for maintenance purposes.

The third component, the search program, takes as minimum inputs a selected hub, a range of distances, and a range of directions. Any other input parameters depend upon the database to be searched. The range of distances may be specified in one of two ways, including a minimum and maximum distance pair and a single distance and deviation. The range of directions can also be specified in one of two ways, including a pair of boundary directions and a single direction with a deviation. Both define an arc about the hub that is to be searched. It is preferred that the direction be specified by compass points.

The basic steps to performing a search include: (1) a user gaining access to the search program via the user interface computer; (2) the user entering the search parameters, including the hub, the range of distances, and the range of directions, at the user interface computer; (3) the search program executing by iterating through all of the appropriate records of the database on the database computer, checking each record to determine if it falls within the parameters; and (4) the search program sending the search results for display to the user on the user interface computer. A record is checked by first calculating the its distance relative to the hub and determining whether or not it falls within the selected range. If it does, the direction of the record relative to the hub is calculated and compared to determine whether or not it falls within the range of directions. If it does, the remainder of the search parameters are checked, and if these parameters match, the record is added to the result list.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 1 is a block diagram of the computers and communications links included in the present invention;

FIG. 3 is an example Web page for entering information into the search program of the present invention;

FIG. 4 is a spherical diagram showing the components of a spherical triangle used to determine the distance and direction of a record property from the hub; and FIG. 5 is an X-Y diagram of corrections to directional values.

DETAILED DESCRIPTION

Figure 2:
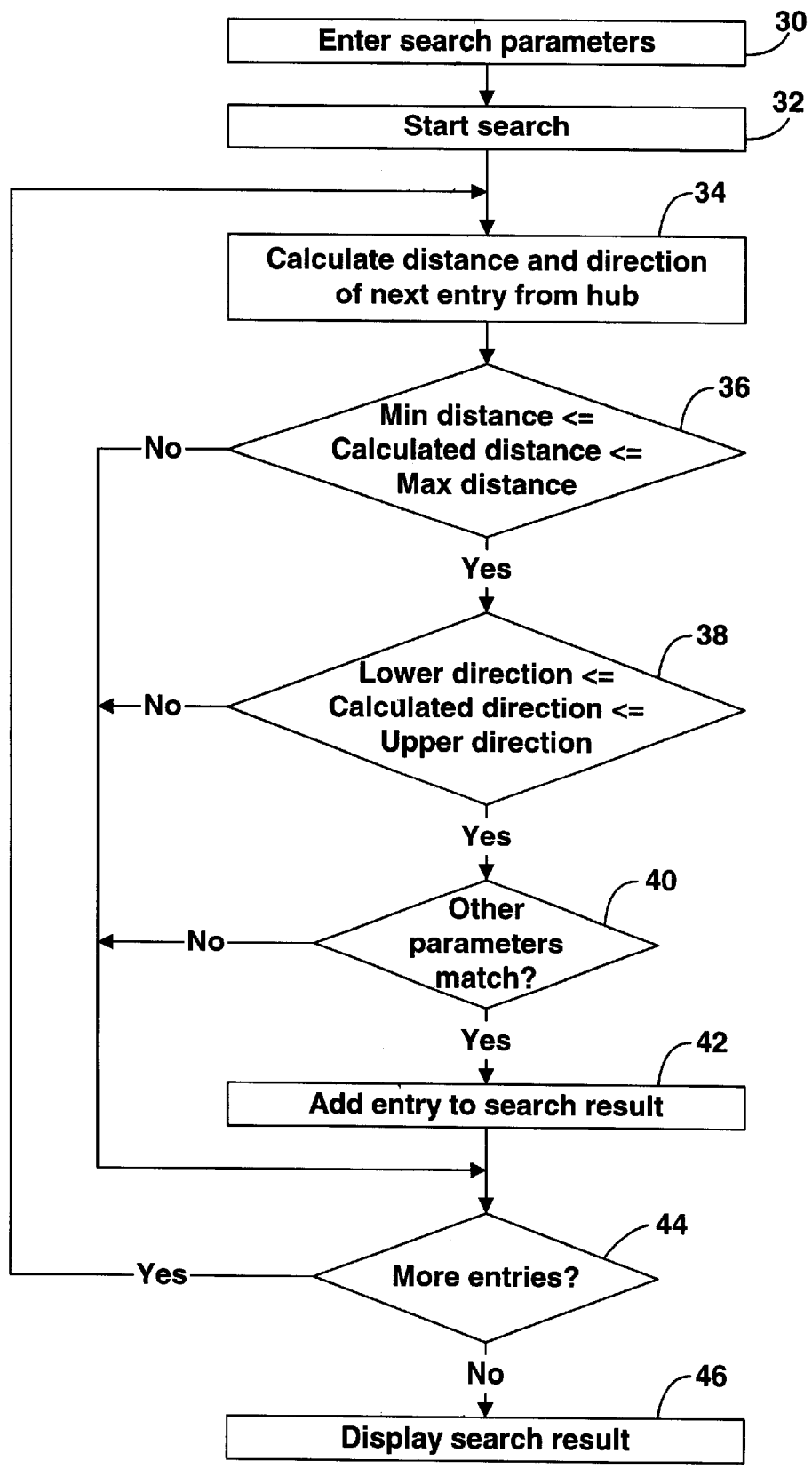
FIG. 2 is a basic block diagram of the search program of the present invention.

The present invention is a means by which a person can search a database on a computer network for geographical locations at selected distances and directions from a selected hub. There are three basic components to the invention: (1) a computer network, (2) a database, and (3) a search program.

1. Computer Network

A computer network is a collection of computers that can communicate with each other for the purpose of exchanging and sharing information. There are two basic types of networks. A local area network (LAN) connects personal computers and workstations, each of which is called a node, over dedicated, private communications links. A wide area network (WAN) connects large numbers of nodes over long-distance communications links, such as common carrier telephone lines. An internet is a connection between networks. The Internet is a WAN that connects thousands of disparate networks around the world, providing global communication between nodes on government, educational, and industrial networks.

FIG. 1 shows a diagram of a portion 10 of a computer network on which the present invention operates. It includes a database computer 12 on which the database resides, a control computer 14 from which the database is controlled, a search computer 16 on which the search program executes, and a user interface computer 18 from which a person performing a search controls the search parameters and views the result. Communications links 20, 22, 24 allow the computers 12, 14, 16, 18 to exchange information. For example, the search parameters entered on the user interface computer 18 by the person performing the search are communicated via link 20 to the search computer 16. During execution of the search program, the search computer 16 reads the database information from the database computer 12 via link 22. Finally, the search result is sent to the user interface computer 18 over link 20 so that it may be viewed by the person performing the search. The database is controlled from the control computer 14 via link 24. This embodiment is merely illustrative; the present invention contemplates that any of the database, search, control, and user interface computers may be combined in various configurations. For example, the database may reside on more than one computer or the search program runs on the user interface computer. In the typical case, a single entity, such as a person or company, will have responsibility for maintaining the database and search program, so it is likely that the search program will run on the same computer on which the database resides.

2. Database

The second component of the present invention is the database. The database includes a record for each geographical location that can be included in the search. The information included in the record is dependent upon that type of search that is being performed. For this reason, the structure of the record, and consequently, the entire database, is designed around the type of search that the database will be the source of information for. For example, if the database is used to find restaurants, the record may include the name of the restaurant, what food it specializes in, its address, its telephone number, its hours of operation, whether or not it takes reservations, whether it has take out and/or delivery service, and its physical location. Note that the record includes both an address and a physical location. The address is typically a street address or post office box, and does not necessarily correspond to the physical location of the site. The physical location, on the other hand, does describe the actual physical location of the site. Although the information contained in a record varies depending upon the type of search for which the database was created, the physical location is always required.

In order for the present invention to work properly, the location must be relative to a reference location on the Earth so that the search program can determine its distance and direction from a specified hub. The most preferred form for the location is as standard map coordinates, where the location is given as the latitude from the equator and the longitude from the prime meridian at Greenwich, England. Each of these values is in units of degrees (°), minutes ('), and seconds ("). For latitude, one second represents a resolution to about 31 meters (102 feet). For longitude, the resolution represented by one second depends upon the latitude; the greater the distance from the equator, the shorter the distance represented. For example, at a latitude of 0° (the equator), one second of longitude represents about 31 meters (102 feet) and decreases so that at latitude 90° (north pole), one second represents 0 meters. If greater resolution is needed, fractions of seconds are used. Other units of measure are contemplated, but degrees are preferred because locations given in degrees are readily available. Other reference locations are contemplated, but coordinates relative to the equator and the prime meridian are preferred because they are readily available.

The present invention contemplates that the database is dynamic. Database records can change as new businesses start up, properties are sold, new properties become available, businesses change addresses, etc. Consequently, there are provisions for database maintenance. Maintenance functions include adding, removing, and modifying records. The present invention contemplates that different records may have different levels of access to the database for maintenance purposes. Such access levels would include complete access, such as the person responsible for overall maintenance of the database, the database administrator, would have. Other access levels may include various combinations of read, add, modify, and remove capability. Read capability, that is the ability to include a record in a search, would typically be given to anyone, although there may be exceptions, such as for databases that are available by subscription only. Modify and remove capabilities would typically be limited to the entity that owns the property that is the subject of a database record. Add capability would be available to entities that would want to list properties or limited to the administrator if the record must be checked before allowing it to be added.

3. Search Program

The third component of the present invention, the component with which the user interacts, is the search program. The search program is capable of performing a geographic search of the database to find a set of database records that have locations at selected distances and directions from a selected hub. When a person wishes to perform a search using the present invention, she selects a hub, a distance from the hub, and a direction from the hub. Any other parameters to be included in the search depend upon the database, such as restricting the search to restaurants that serve Italian food or to commercial properties that have a selected range of floor space.

Before a person can request a search, access must be obtained to the search program. In the preferred embodiment, the search program is accessible through a site on the World Wide Web (the "Web") portion of the Internet. To access the search program, a person must log onto the Internet and move to the appropriate search site.

A basic flow diagram of the search program is shown in FIG. 2. The person requesting a search, the user, enters a hub, a distance, a direction, and any other parameters relevant to the particular database, as at 30. FIG. 3 illustrates one possible format for a Web page that allows the user to enter this information.

One aspect of the present invention is the ability to perform geographic searches relative to a selected hub, rather than to the reference location. In order to perform such a search, it is necessary that the search program know the coordinates of the selected hub relative to the reference location. Consequently, in practice, a second database is maintained of locations that can be selected as a hub. Typically, this hub database will include, for example, city and town centers, topographical features such as mountains, and artificial constructs such as buildings and highway interchanges. A hierarchy may be imposed upon the hub database for convenience to the searcher. For example, hubs may be subdivided by region, nation, and/or state, so that a subdivision is first selected, making available a list of hubs for that subdivision. In the example Web page of FIG. 3, the hub is selected by entering a city and state in boxes 80, 82.

The distance from the hub can be specified using any type of distance measurement, but miles and/or kilometers are preferred. The present invention contemplates two methods for specifying the distance, by specifying a minimum and maximum distance or by specifying a single distance and a deviation. When using the former, obviously, the maximum distance must be greater than the minimum distance. If the minimum measurement is zero, the area searched is a portion of a circle centered on the hub. If the minimum is non-zero, the area searched is a portion of a circular ring centered on the hub. When using a single distance and deviation, if the deviation is the same or greater than the distance specified, the area searched is a portion of a circle centered on the hub. Otherwise, the area searched is a portion of a circular ring centered on the hub, where the width of the ring is twice the deviation. The deviation may be specified by the searcher or it may be a default value, such as one mile. Regardless of how the distance is specified by the user, the distance values are preferably converted to minimum and maximum distances for ease in comparison by the search program.

In the example Web page of FIG. 3, the distance is entered by selecting from a predetermined set of ranges in a drop-down menu 84. For example, the range selections may include 0–5 miles, 5–10 miles, 10–20 miles, etc.

The direction from the hub can be specified using any type of direction measurement, such as degrees or compass direction. The present invention contemplates two methods for specifying the direction, by an upper and lower limit pair or by a single direction and a deviation. The limit pair defines an arc of a circle through which the records are compared. Reversing the lower and upper limits reverses the arc. For example, if the searcher specifies a lower limit of 315° and an upper limit of 45°, the search will be conducted over an arc of 90° centered directly north of the hub. On the other hand, if the searcher specifies a lower limit of 45° and an upper limit of 315°, the search will be conducted over an arc of 270° centered directly south of the hub.

The preferred manner in which to specify direction, one that is more understandable by the general public, is by use of compass points. Compass points can be used as lower and upper range limits or as a single direction with a deviation. When using a single direction and deviation, it is preferred that the deviation be half of the difference between compass points. In this way, an entire circle can be covered without overlap. For example, if eight compass points (N, NE, E, SE, S, SW, W, and NW) are used, the preferred default deviation is 22.5°, half the angular difference from one compass point to the adjacent compass point. Greater division of compass points leads to a smaller deviation. It is also contemplated that the deviation is selected so that there is an overlap between direction ranges.

In the example Web page of FIG. 3, the direction is entered by selecting from a predetermined set of compass directions in a drop-down menu 86. For example, the direction selections may include North, Northeast, East, Southeast, South, Southwest, West, and Northwest, where each selection covers an arc of 45°, so that there is no overlap between selections.

Optionally, other special information parameters specific to the particular database with which the search program is used are entered. In the example of FIG. 3, the user selects a type of store from a drop-down menu 88. The selections might includes such stores as clothing, restaurant, convenience, liquor, food, etc.

After the appropriate parameters are entered, the user indicates to the search program that the parameters are entered and that the search is to be performed, as at 32. In the example of FIG. 3, the user clicks on the Search button 90. The search program enters a loop to compare all database records to the selected parameters. While a particular order is shown in the flow diagram of FIG. 2, there is no particular preferred order for comparing the parameters. First, the distance and direction from the hub to the record property is calculated, as at 34. If the calculated distance falls outside the minimum and maximum distances, as at 36, the program loops back to check the next record, as at 46. If the calculated direction falls outside the lower and upper direction limits, as at 38, the program loops back to check the next record, as at 44. Otherwise, all other selected parameters are compared to the record, as at 40. If any of the other parameters do not match, the search program loops to check the next record, as at 44. Otherwise, the record falls within all of the parameters entered by the user and is added to a result list, as at 42.

There are a several methods to determine the distance and direction that a record property is to the hub.

In the first method, the distance is calculated as the length of an arc of a spherical triangle. A spherical triangle, shown in FIG. 4 at 58, is the shape created by the intersection of three great circles of a sphere, in this case, the Earth. One of the circles 60 passes through the two poles and the record property 62. The arc 64 of this circle 60 passes through an angle 'a' that is the difference between the hub and record property latitudes. The second great circle 66 passes through the hub 68 and is perpendicular to the first circle 60. The arc 70 of this circle 66 passes through an angle 'b' that is the difference between the hub and record property longitudes. The third circle 72 passes through both the record property 62 and the hub 68. The angle 'c' of the arc 74 between these points is determined by the equation $$\cos c = \cos a * \cos b + \sin a * \sin b$$

Once the angle c of the arc 74 is determined, its length, the distance from the property to the hub 'D', can be determined from the equation $$D = rc$$

where r is the radius of the Earth and c is the angle of the arc 74 in radians. The direction 'A' relative to the westerly direction is determined by the equation $$\sin A = \sin a / \sin c$$

In order to get the direction A relative to the hub so that north is at 0°, A must be adjusted depending upon the geometric quadrant that the record property is from the hub. As shown in FIG. 5, if the record property is in Quadrant I, A is subtracted from 90°. If the record property is in Quadrant II, 270° is added to A. If A is in Quadrant III, A is subtracted from 270°. If A is in Quadrant IV, 90° is added to A.

In the second method, the location of the record property relative to the hub is calculated by subtracting the record property location from the hub location. This gives a latitude and longitude in degrees relative to the hub. Assuming that the distances are small enough that the Earth can be approximated as flat, the relative latitude 'X' is converted to distance by multiplying by the distance per unit of latitude, for example, by 31 meters per second of latitude, and the relative longitude 'Y' is converted to distance by multiplying by the distance per unit of longitude at the given latitude. The distance per unit of longitude varies with latitude in a manner that is known. Once the relative latitudinal and longitudinal distances are calculated, the distance 'D' between the record property and hub is calculated as the square root of the sum of the squares of the relative latitude and longitude, or $$D^2=X^2+Y^2$$

The direction 'A' is determined by the equation $$\sin A = Y/D$$

In order to get the direction A relative to the hub so that north is at 0°, A is adjusted as described above for the first embodiment.

After the last record is checked, the result list is displayed to the user 48 and the search program ends. Different levels of information may be displayed to the user. For example, an initial result display may show an entry that includes only basic information for each property, and each entry includes a hypertext link to a detailed description of the property.

Thus it has been shown and described a geographic search program and database which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A method for location of real estate properties by a user, said method comprising the steps of:

(a) providing a property database of real estate properties, said property database including a property record for each of said properties, said property record including a physical location of said property;

(b) providing a hub database of hubs, said hub database including a hub record for each of said hubs, said hub record including a physical location of said hub;

(c) selecting a hub;

(d) selecting a range of distances from said hub;

(e) selecting a range of directions from said hub, said range of directions being independent of said range of distances;

(f) checking each of said property records to determine if said property is within said selected range of distances and said selected range of directions from said hub;

(g) creating a result that includes all of said properties that fall within said selected range of distances and said selected range of directions from said hub;

(h) presenting said result to said user.

2. The method of claim 1 wherein said range of distances is specified by a single distance and a deviation.

3. The method of claim 2 wherein said deviation is predetermined.

4. The method of claim 1 wherein said range of distances is specified by a minimum distance and a maximum distance.

5. The method of claim 1 wherein said range of directions is specified by a single direction and a deviation.

6. The method of claim 5 wherein said deviation is predetermined.

7. The method of claim 5 wherein said single direction is identified by a compass point.

8. The method of claim 1 wherein said range of directions is specified by a first direction and a second direction.

9. The method of claim 1 wherein said property record includes additional special information and wherein said method includes the additional steps of selecting a range of special information, checking each of said property records to determine if said property special information is within said selected range of special information, and restricting said result to only those of said properties that fall within said selected range of special information.

10. A system for location of real estate properties by a user, said system comprising:

(a) a global computer network including a database computer, a user interface computer, and a search computer;

(b) a property database of real estate properties, said property database residing on said database computer, said property database including a property record for each of said properties, said property record including a physical location of said property;

(c) a hub database of hubs, said hub database residing on said database computer, said hub database including a hub record for each of said hubs, said hub record including a physical location of said hub;

(d) an input interface displayed on said user interface computer, said input interface providing the ability for said user to enter search parameters and to initiate a search, said search parameters including a hub selection, a range of distances selection, and a range of directions selection, said range of distances selection being independent of said range of directions selection;

(e) a search program that runs on said search computer, said search program using said search parameters, said hub database, and said property database to create a result that includes all of said properties that are within said range of distances and said range of directions from said hub; and (f) a result interface that displays said result to said user.

11. The system of claim 10 wherein said range of distances is specified by a single distance and a deviation.

12. The system of claim 11 wherein said deviation is predetermined.

13. The system of claim 10 wherein said range of distances is specified by a minimum distance and a maximum distance.

14. The system of claim 10 wherein said range of directions is specified by a single direction and a deviation.

15. The system of claim 14 wherein said deviation is predetermined.

16. The system of claim 14 wherein said single direction is identified by a compass point.

17. The system of claim 10 wherein said range of directions is specified by a first direction and a second direction.

18. The system of claim 10 wherein said property record includes special information, said search information includes a range of special information selection, and said search program restricts said result to include only properties that are within said range of special information.

* * * * *